(12) United States Patent
Wilson

(10) Patent No.: US 10,301,101 B2
(45) Date of Patent: May 28, 2019

(54) CONTAINER AND PROCESS FOR MAKING A CONTAINER

(71) Applicant: PALM CONSOLIDATED PTY. LTD., Moorabbin, Victoria (AU)

(72) Inventor: Robert Wilson, Moorabbin (AU)

(73) Assignee: PALM CONSOLIDATED PTY LTD, Moorabbin, Victoria (AU)

( * ) Notice: Subject to any disclaimer, the term of this patent is extended or adjusted under 35 U.S.C. 154(b) by 301 days.

(21) Appl. No.: 15/108,586

(22) PCT Filed: Jan. 21, 2015

(86) PCT No.: PCT/AU2015/000031
§ 371 (c)(1),
(2) Date: Jun. 28, 2016

(87) PCT Pub. No.: WO2015/109363
PCT Pub. Date: Jul. 30, 2015

(65) Prior Publication Data
US 2016/0318692 A1  Nov. 3, 2016

(30) Foreign Application Priority Data

Jan. 21, 2014  (AU) ................................ 2014900174

(51) Int. Cl.
*B65D 81/38* (2006.01)
*A47G 19/22* (2006.01)
(Continued)

(52) U.S. Cl.
CPC ..... *B65D 81/3865* (2013.01); *A47G 19/2272* (2013.01); *A47G 19/2288* (2013.01);
(Continued)

(58) Field of Classification Search
CPC ................ A47J 41/0044; A47J 41/0061; A47J 41/0072; B65D 81/3874; B65D 81/3886
See application file for complete search history.

(56) References Cited

U.S. PATENT DOCUMENTS 1,999,670 A * 4/1935 Strouse ..................... F25D 3/14
220/592.16
3,680,330 A * 8/1972 Canosa ............... A47G 19/2288
62/284
(Continued)

FOREIGN PATENT DOCUMENTS

ES         2299302 A1    5/2008
JP       2000184969 A    7/2000
(Continued)

OTHER PUBLICATIONS

International Patent Application No. PCT/AU2015/000031, "Written Opinion" dated Apr. 2, 2015.
International Patent Application No. PCT/AU2015/000031, "Search Report" dated Apr. 2, 2015.

*Primary Examiner* — Andrew T Kirsch
(74) *Attorney, Agent, or Firm* — Kilpatrick Townsend & Stockton, LLP

(57) ABSTRACT

The present invention relates to a container for food having an integrally formed receptacle body, in which the receptacle body has a base, an inner wall and an outer wall spaced from the inner wall to form an insulating region therebetween. The insulating region may contain an insulating material that is molded in the insulating region.

16 Claims, 14 Drawing Sheets

(51) Int. Cl.
- *B29C 45/00* (2006.01)
- *B65D 43/02* (2006.01)
- *B65D 43/16* (2006.01)
- *B65D 47/08* (2006.01)
- *B65D 51/18* (2006.01)
- *B29C 45/16* (2006.01)
- *B29K 33/04* (2006.01)
- *B29L 31/00* (2006.01)

(52) U.S. Cl.
CPC ...... *B29C 45/0001* (2013.01); *B65D 43/0225* (2013.01); *B65D 43/16* (2013.01); *B65D 47/08* (2013.01); *B65D 51/18* (2013.01); *B65D 81/3874* (2013.01); *B29C 45/16* (2013.01); *B29C 45/1657* (2013.01); *B29C 45/1676* (2013.01); *B29C 2045/1668* (2013.01); *B29K 2033/04* (2013.01); *B29L 2031/712* (2013.01); *B65D 2251/009* (2013.01); *B65D 2251/0021* (2013.01); *B65D 2251/0028* (2013.01); *B65D 2251/0081* (2013.01); *B65D 2543/00046* (2013.01)

(56) References Cited

U.S. PATENT DOCUMENTS

| | | | | |
|---|---|---|---|---|
| 3,998,072 A * | 12/1976 | Shaw | ................ | B65D 81/3876 62/372 |
| 4,383,422 A * | 5/1983 | Gordon | ............. | B65D 81/3886 215/13.1 |
| 4,793,149 A * | 12/1988 | Riche | ................ | B65D 81/3883 165/46 |
| 5,243,835 A * | 9/1993 | Padamsee | ........... | A47J 41/0044 62/372 |
| 5,551,592 A * | 9/1996 | Barton | ............... | B65D 81/3886 220/571 |
| 6,913,165 B2 * | 7/2005 | Linz | ........................ | A47J 43/27 220/568 |
| 2008/0006643 A1 | 1/2008 | Ma | | |
| 2010/0125931 A1 | 5/2010 | Arakelian | | |

FOREIGN PATENT DOCUMENTS

| | | |
|---|---|---|
| JP | 2005239204 A | 9/2005 |
| JP | 2005247341 A | 9/2005 |

* cited by examiner

CONTAINER AND PROCESS FOR MAKING A CONTAINER

CROSS REFERENCE TO RELATED APPLICATION

This application is a national stage application under 35 U.S.C. § 371 of PCT/AU2015/000031 filed Jan. 21, 2015, which claims priority to Australian application no. 2014900174 filed Jan. 21, 2014, the disclosures of which are hereby incorporated by reference herein in their entireties.

FIELD OF THE PRESENT INVENTION

The present invention relates to a container for food, a process for making a food container, and an apparatus for making the container. Ideally, the container has thermal insulating properties.

BACKGROUND OF THE INVENTION

Catering standards require that food be served at either an elevated temperature or a chilled temperature. In addition to providing good taste and texture at these temperatures, bacteria, fungi and virus do not proliferate well. To maintain the temperature of food after having being cooked or refrigerated, food can be placed into a thermally insulated container, particularly when the food is to be transported prior to consumption. For example, hot beverages such as tea and coffee, may be placed in the thermally insulated cups and flasks.

Thermally insulated containers are essentially a double walled structure comprising an inner receptacle and an outer receptacle in which the inner and outer receptacles are made in separate moulds and joined together at a mouth of the container. Thermal insulating material may be located between the inner and outer receptacles, otherwise an air gap may be left between the inner and outer receptacles to act as the insulating material.

There are a number of difficulties with the insulated containers presently available, including for instance, the inner and outer receptacles are often made with tapered walls to allow one to fit inside the other and then joined, typically by welding at the top of the container. This results in a container having outer dimensions that is typically 30 to 40% larger than the total capacity of the container for holding the food. Moreover, the containers can be unstable on account of the containers have a relatively high centre of gravity.

In addition, these types of insulated containers are often relatively heavy, compared to single walled containers, which can have the negative property of acting as a heat sink.

In addition, thermally insulated containers are typically manufactured by a multifaceted process in which the inner receptacle and outer receptacles are moulded in their respective moulds, and then the inner receptacle is connected to the outer receptacle in a dedicated manufacturing step. The time and cost of manufacturing an insulated container is therefore often considerably more than the cost for manufacturing singled walled containers.

It is therefore an object of the present invention to provide an alternative container and a process for manufacturing the container.

SUMMARY OF THE INVENTION

The present invention relates to a container for food, the container including:

a base and an inner wall extending from the base to form an entrance for placing food in the container; and an outer wall extending about the inner wall at a spacing from the inner wall so as to define an insulating region between the outer wall and the inner wall, wherein the insulating region has an opening for disposing insulating material in the insulating region;

wherein the base, the inner wall, and the outer wall of the container are integrally formed and provide a receptacle body.

The integrally formed container is formed without joining or connecting together separate components. As such, the integrally formed receptacle is "seamless" in the sense that it is free of joins. For example, the body of the integrally formed container may be formed during a single casting step. It will be appreciated however, that during a single casting step, two or more die casts may be placed together to form a single continuous die cavity and that hair seam lines may be formed on the surface of the container at the junction between the die casts even though the container has an integrally formed body. It is also possible that the body of the integrally formed container may be forged.

When the integrally formed container is made in a single casting step, ideally a fluidised material flows from the base to the inner wall of the container, and from the inner wall to the outer wall during the manufacture thereof.

In an embodiment, the container may be free of a solid insulating material disposed in the insulating region, in which case the insulating region comprises air which can pass through the opening. In other words, the insulating region may be retained as a gap or open space, such as an air gap or a gas gap, to provide thermal insulation between the inner wall and the outer wall.

In another embodiment, the container may include an insulating material disposed in the insulating region in which the insulating material is in a solid state. In this embodiment the insulating region may be completely filled with the insulating material. Alternatively, the insulating region may only be partially filled with the insulating material.

In an embodiment, the insulating material disposed in the insulating region may be any suitable material, and ideally has a thermal energy conductivity that is less than the thermal conductivity of the base, the inner wall and the outer wall. It will be appreciate that the base, the inner wall and the outer wall will have similar thermal conductivities as they are integrally formed and are therefore ideally, but not necessarily, made of the same materials. Examples of suitable insulating material include polymeric materials such as thermoplastic elastomers including transparent and opaque elastomers, expandable polymers such as polystyrene and so forth.

The insulating material may also be more flexible than the base, inner wall and outer wall of the receptacle body. The insulating material may container rubber. In other words the insulating material may be rubberised.

Ideally, the insulating material is disposed in the insulating region initially as a flowable material, and thereafter cured into a non-flowing condition. The non-flowing condition of the cured insulating material layer may be more generally described as a solid. In other words, the insulating material may be moulded in-situ in the insulating region and supplied initially as a flowable material into the opening of the insulating region.

The insulating material may also extend over the base of the container.

The entrance for placing food in the container may be defined by an upper part of the inner wall of the container.

Suitably, the inner wall extends beyond an upper end (part) of the outer wall and the inner wall extends to the base of the container, and the base of the container protrudes beyond the outer wall.

Suitably, the inner wall extends the full length and beyond opposite ends of the outer wall.

The inner wall may have an essentially cylindrical configuration and the outer wall may have an essentially cylindrical configuration, and accordingly, the insulating region may also have an annular cylinder formation between the inner wall and the outer wall. In addition, the inner and outer walls may have a tapering structure in which the inner diameter of the receptacle body defined by the inner wall decreases moving down the container from the entrance of the container to the base.

The inner wall may have a constant thickness, although in other embodiments it will be appreciated that the inner wall may be of increasing thickness from the entrance of the container toward the base. The outer wall may also have a constant thickness, although in other embodiments, the thickness of the outer wall may increase moving down the container toward the base. The width of the insulating region between the inner and outer walls may also increases moving in a direction toward the base of the container.

The inner wall, insulating region and outer wall may have a total thickness range from 1.5 to 9 mm, and ideally from 3 to 6 mm, and even more ideally 3.7 mm at an upper edge of the outer wall and 6.4 mm at the base.

The inner wall may have a thickness ranging from 0.5 to 3 mm, and ideally a uniform thickness of 1.5 mm from an upper end to a lower end.

The outer wall may have a thickness ranging from 0.5 to 3 mm, and ideally a uniform thickness of 1.0 mm from an upper end to a lower end.

The insulating region may also have a thickness ranging from 0.5 to 3 mm, and ideally from 1.0 at and upper end to 4.0 mm at a lower end, and even more ideally from 1.5 mm at an upper end to 3.6 to 3.9 at a lower end.

The insulating region may have an annular formation between the inner and outer walls.

The annular formation may be a continuous space or a discontinuous space in which pillars or connection elements interconnect the inner and outer walls.

Ideally, the container includes at least two equally spaced connection elements between the inner and outer walls. In one embodiment, the connecting elements may be spaced from an upper edge of the outer wall. In an embodiment, the connecting elements may be spaced from the lower edge of the outer wall. In another embodiment, the connecting elements may connect and extend from the upper and lower edges of the inner wall.

The outer wall of the container may include an aperture that allows air to be vented from the insulating region while the insulating material is being disposed in the insulating region. In other embodiments, the outer wall and the cavity may be adapted so that no venting is required. In one example, the outer wall may not include apertures.

The opening may include a first aperture extending about a lower edge of the outer wall, and suitably be in the form of an annular aperture.

The opening may also include a second aperture extending about an upper edge of the outer wall. When the insulating material is disposed in the insulating region, the insulating material may extend outwardly of the second aperture to providing a sealing surface on which a lid may be placed.

The opening may also include a third aperture in the outer wall that is spaced from the upper and lower edges of the outer wall. Ideally, the third apertures may be arranged and sized so that the insulating material can extend through the third apertures and provide a gripping surface for the fingers of a user.

Ideally, the third aperture may be arranged to provide an ergonomic fit to the fingers of a user's hand. For example, the third aperture may include elongate cutouts arranged longitudinally of the outer wall. The cutouts may also be arranged about the circumference of the outer wall. Sets of the apertures or cutouts may also be diametrically disposed on opposite sides of the outer wall.

The container may also have a handle extending from either one, or a combination of, the inner wall and the outer wall. The handle may be integrally formed with either one or a combination of the inner wall, the outer wall or the base.

The container may include a fastening means, such as a screw thread adjacent to the entrance of the container for attaching lid to the container. The screw thread may be arranged on an outer face of either the outer wall or the inner wall. Ideally, the screw thread is arranged on an outer face of an upper part of the inner wall that extends beyond the outer wall.

The thread may be any suitable thread including a single thread, a double thread and a triple thread that extends about the entrance. The thread may include at least two thread sections, and ideally, three thread sections that extend about the container in a direction about the perimeter of the container, and there are gaps between the thread sections, which allow co-operating thread sections of a lid to be aligned with the gaps and passed there through. For example, the thread sections may each include a thread crest extending from an outer face of the inner wall that are separated by gaps about the inner wall, and the thread crest of each may have the same orientation extending away from the entrance of the container about the container, and the lid has co-operating groove sections on an inside face of the lid that receives the male thread ribs to screw thread the lid onto the container. The co-operating grooves may have gaps therebetween.

The container may include a lid having a co-operating screw thread for attaching the lid to the container.

The lid may also have a skirt defining an upper opening through which the contents can be consumed from the container, a lower portion on which the co-operating screw thread is provided, and an openable closure having a pivotable top panel that can be pivoted between: i) a closed position in which the top panel forms a seal with the upper opening, and ii) an opened position in which the top panel is oriented at an angle to the closed position to allow a user to drink from the container.

The inner wall, outer wall and the connecting elements may be made of a transparent or translucent material such as, for example, a polymeric material. The entrance portion and the thermal insulating layer may also be made of transparent or translucent materials.

The entrance portion may interconnect the inner wall and the outer wall and may, for example, be in the form of a rim.

In another example, the entrance portion may be in the form of an upper wall from which the inner wall and the outer wall extend, and in which the upper wall has an annular formation extending in an axial direction of the inner and outer side walls.

The present invention also relates to a lid for fitting to a container such as, but by no means limited a mug, for closing the receptacle, the lid including:
   a skirt defining an upper opening for drinking;
   an openable closure having a pivotable top panel that can be pivoted between a closed position in which the top panel forms a seal with the upper opening, and an opened position in which the top panel is oriented at an angle to the closed position to allow a user to drink from the container; and
   a fastener for attaching the lid to the container.

The fastener may include a screw thread on a lower of the skirt.

The present invention also relates to a process of making a food container, the process including:
   forming a receptacle body of the container having a base, an inner wall and an outer wall that are integrally formed, and in which the inner wall extends from the base to form an entrance for placing food in the container, and the outer wall extends about the inner wall at a spacing thereto, wherein the spacing between the inner wall and the outer wall defines an insulating region, and wherein the insulating region has an opening for disposing insulating material in the insulation region.

The step of forming the integrally formed body may include supplying flowable material into a mould so as convey a flowable material, into the base region of the mould to cast the base of the container, from the base region into the inner wall region to form the inner wall of the container, and from the inner wall region into the outer wall region to cast the outer wall. The outer wall region may extend in a direction toward the base region and the process may include conveying the flowable material along the outer wall region.

The step of forming the integrally formed body may include moving multiple components of a die cast into a closed operative position for moulding, wherein the components of the die cast include:
   i) a first mould having an annular trough having an inward wall and an outward wall, the inward wall being provided by a central plug; and
   ii) a second mould having an annular wall formation and base wall,
   and moving the die cast components into the operative position includes locating the annular wall formation in the annular trough, and thereby define a base region between the base wall of the second mould and the central plug of the first mould for casting the base of the container, and define the inner wall region between the inward wall of the first mould and the annular wall for casting the inner wall of the container, and define the outer wall region between the outward wall and the annular wall for casting the outer wall of the container.

The inner wall region and the outer wall region of the mould may define essentially cylindrical formations and the outer wall region extends over at least of the length of the inner wall region.

The step of forming the integrally formed body may include the flowable material being conveyed from the inner wall region to the outer wall region via a passageway. The passageway may extend through the annular wall formation. There may be two, or more passageways, and ideally, three equally spaced passageways in the annular wall. It will be appreciated that the openings, including first and second openings may be formed in the insulating region by a gap being formed between the inner and outer walls of the body at the upper and lower ends of the outer wall of the body.

The first mould may also include displacement elements extending from the outer face of the annual wall formation that contact the outerward wall of the wall formation and thereby occupy regions of the outer wall region. The displacement elements thereby form a third opening/aperture in the outer wall of the container which can accommodate the insulating region of the body.

It is within the scope of the present invention that the first and second moulds may include multiple sub-mould parts that can move relative to each other.

The first mould may also include an entrance region at a distal end of the annular trough such that the step of injecting the flowable material includes the flowable material being fed into the base region flowing along the inner wall region from the base region to the entrance region.

In the situation in which the process includes supplying a flowable material, such as injecting the flowable material, the process includes allowing the flowable material to harden prior to opening the closed mould to the casting of the container. The term "harden" embraces the flowable material becoming self-supporting, but need not require that the flowable material be fully cured.

The process may also include locating an insulating material between the inner wall and outer wall of the container.

The step of locating the insulating material in the insulating region may include positioning the body in a second mould having a bottom plate that is spaced from the base of the body to form a bottom region, and a peripheral wall portion engaging the outer wall of the body (so as to enclose the opening of the cavity), and supplying (such as injecting) the thermal insulating material into the bottom region to cause the insulating material to flow over the base of the body and into the insulating region between the inner wall and the outer wall, and thereafter setting so as to be non-flowing.

Supplying or injecting the insulating material may also include the insulating material flowing through the third opening (aperture) in the outer wall of the body.

While injecting the thermal insulation into the insulating region, air or gas may be vented from the insulating region. Ideally, the insulating region cavity may be vented via one or more of the apertures in the outer wall. In other embodiments, it will be appreciated that no venting is required. For example, the insulating region may have an opening at the upper end of the outer wall by which air in the insulating region can be vented while the insulating material is being injected into the insulating region.

The present invention also relates to an apparatus for making a food container, the apparatus including a first moulding station including:
   a) a first mould having central plug and an outer peripheral boundary between which an annular trough is provided;
   b) a second mould having an annular wall formation; and in which the male and female moulds can be closed together so that the trough formation receives the annular wall formation so as to define a base region for casting the base of the container, an inner wall region for casting the inner wall of the container, and an outer region for casting the outer wall, wherein the base region is flow communicating with the inner wall region, and the inner wall region is flow communicating with the outer wall region so that the integrally formed receptacle can be formed from the apparatus.

The apparatus may also include a first injector for injecting the first flowable material in the first moulding station.

The apparatus may also include a first flowable material source.

The apparatus may also include a second moulding station that receives the body of the container from the first moulding station, wherein the second moulding station has
 a) a peripheral wall portion that engages an outer wall of the container, and
 b) bottom portion that is spaced from the base of the container so as to form a casting space.

The apparatus may also include a second injector for injecting thermal insulating material in the form of a second flowable material in the casting space for forming a layer of the insulating material therein.

The apparatus may also include a second flowable material source.

The container may have any one or a combination of the features of the process, and/or features of the apparatus described herein. Similarly, the process may also include any one or a combination of the features of the container or the apparatus described herein. Finally, the apparatus may also include any one or a combination of the features of the container or the apparatus described herein.

BRIEF DESCRIPTION OF THE DRAWINGS

The present invention will now be described with reference to the accompanying figures, of which.

DETAILED DESCRIPTION

Figure 1:
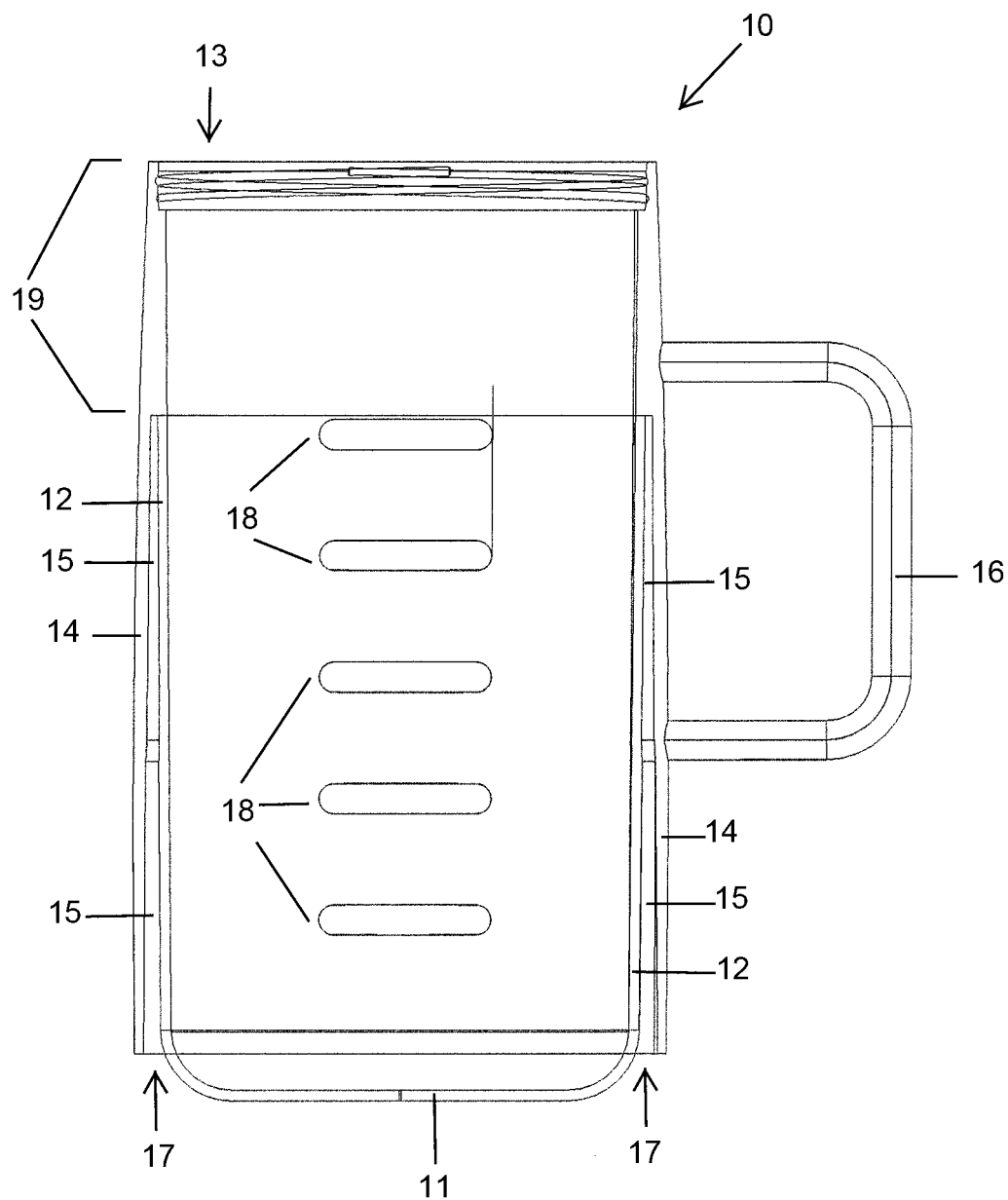
FIG. 1 is a front view of an integrally formed body of a container of an embodiment in which the walls are illustrates as transparent.

Embodiments of the present invention will now be described with reference to the accompanying figures. To assist in describing the embodiments, various features have been allocated reference numerals in the text and the figures. However, in order to maintain the clarity of the figures, not all of the reference numbers may have been used in each of the Figures.

The food container 10 can be used for any food and may have any shape, but as can be seen in the Figures, the container is ideally shaped as a cup or mug for hot or cold beverages. In other examples, the container may also be flask, bowl or plate.

Figure 2:
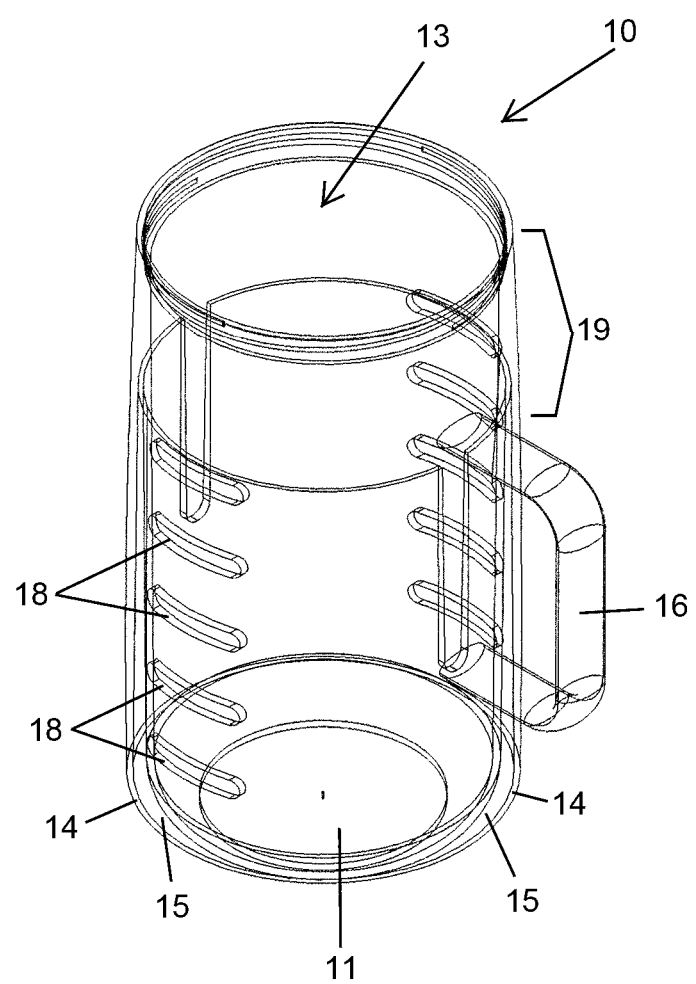
FIG. 2 is an isometric view the integrally formed body shown in FIG. 1.
Figure 3:
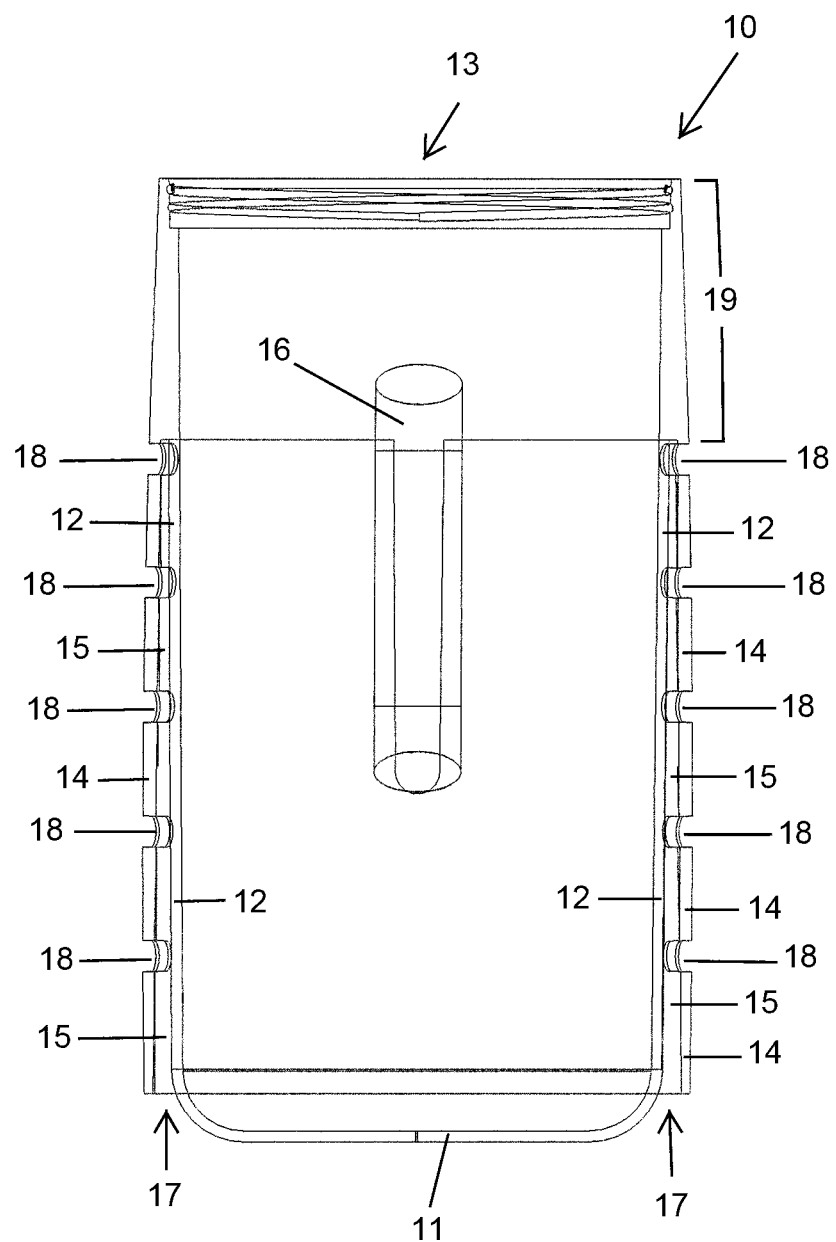
FIG. 3 is a left side view of the integrally formed body shown in FIG. 1.

With reference to FIGS. 1 to 3, the food container 10 has a receptacle body including a base wall 11 and an inner wall 12 extending upward from the base wall 11 to form an upper entrance portion 13. The receptacle body of the container 10 also includes an outer wall 14 extending around the inner wall 12 and is spaced from the inner wall 12 to form a cavity or insulating region 15. The insulating region 15 extends longitudinally along the inner wall 12 and the outer wall 14, and about at least part of the circumference of the container 10.

The base wall 11, the inner wall 12 and the outer wall 14 of the receptacle body are integrally formed. As can best be seen in FIG. 2, the container 10 also includes a handle 16 that extends from the inner wall 12 through the outer wall 14 in a D-shape. The handle 16 may have a bridge or connecting element that interconnects the inner wall 12 and the outer wall 14 between the opposite ends of the handle 16.

The upper entrance portion 13 of the container 10 is in the form of annular wall formation and the upper end of the handle 16 extends directly from the annular wall formation.

The insulating region 15 formed between the inner wall 12 and the outer wall 14 has an opening 17 that faces the base wall 11 and downwardly, when the container 10 is oriented in a right position, for example, when the container 10 is sitting on its base 11 and the entrance 13 is facing upwardly. The base 11 may project beyond the outer wall 14 so that an edge of the outer wall 14 is spaced from an outermost portion of the base 11 of the container 10.

Ideally the base 11, the inner wall 12 and the outer wall 14 are integrally formed so as be free of seams and are constituted by a homogenous material. In other words, the base 11, the inner wall 12 and the outer wall 14 may, for example be a forged body, but is suitably a body cast in single casting step. When cast in a single casting step, the integrally formed receptacle body of the container 10 may be formed of any flowable material, and is suitably made of polymeric materials, such as transparent or translucent polyester that is free of Bisphenol A compounds.

The outer wall 14 also has elongate apertures 18 that extend longitudinally in a circumferential direction about the container 10 and at least one of which is located at the distal end of the insulating region 15. As will be explained in more detail below, the apertures 18 located at the distal end of the insulating region 15 can allow air in the insulating region 15 to be vented when a thermal insulating material is injected into the insulating region 15. It will also be appreciated that instead of, or in addition to apertures 18, further openings may be provided to allow venting. In other situations, it is possible that the shape of the insulating region 15 and the manner in which the cavity 15 is filled will be such that no venting apertures will be required. In other embodiments, not illustrated, it is also possible that no aperture may be provided in the outer wall 14.

As can be seen two sets of apertures 18 are arranged down opposite sides of the outer wall 14. In addition to allowing venting, finger grips can be formed at the apertures by an insulating material being located therein and optionally protruding from the apertures.

Figure 12:
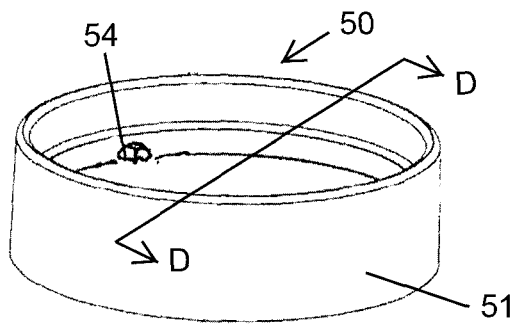
FIG. 12 is an isometric view of the lid that can be used to close the container of container illustrated in FIGS. 1 to 11.
Figure 13:
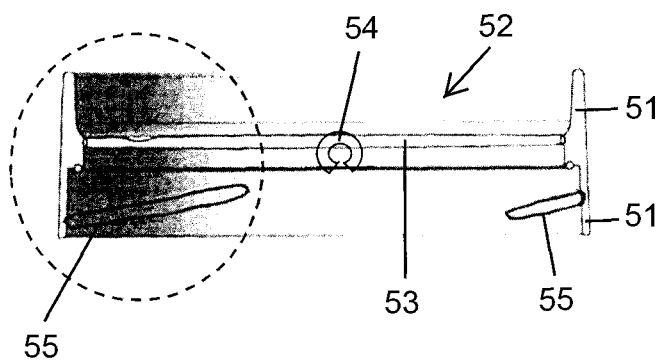
FIG. 13 is a cross-sectional view along the line D-D of the lid shown in FIG. 12.
Figure 14:
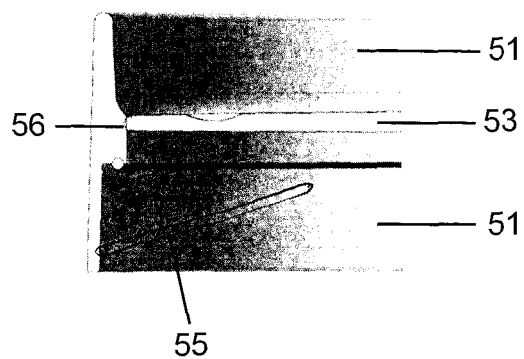
FIG. 14 is an enlarged view of the section encircled in the dotted line in FIG. 13.

The upper annular wall formation 19 may also include a screw thread that co-operates with a lid, such as that shown in FIGS. 12 to 14 to seal the entrance 13. The upper annular wall 19 may also have a rim or a rubber seal for forming a seal with a lid.

The annular wall 19 may also be sized so to extend above the cavity by any desired degree. In the case of the preferred embodiment, the annular wall 19 may extend above the cavity by at least 10% of the length of the insulating region 15, and suitably approximately 25% of the cavity 15.

As shown in FIGS. 1 to 3, the insulating region 15 between in the inner and outer walls 12, 14 may be retained as an air gap, which acts as a thermal insulation between the inner wall 12 and the outer wall 14. However, preferably a thermal insulating material 20 having a lower thermal conductivity than the integrally formed body is located in the insulating region 15. Examples of suitable material include elastomers, expandable polymers and so forth. The thermal insulating material may be opaque and transparent.

Figure 4:
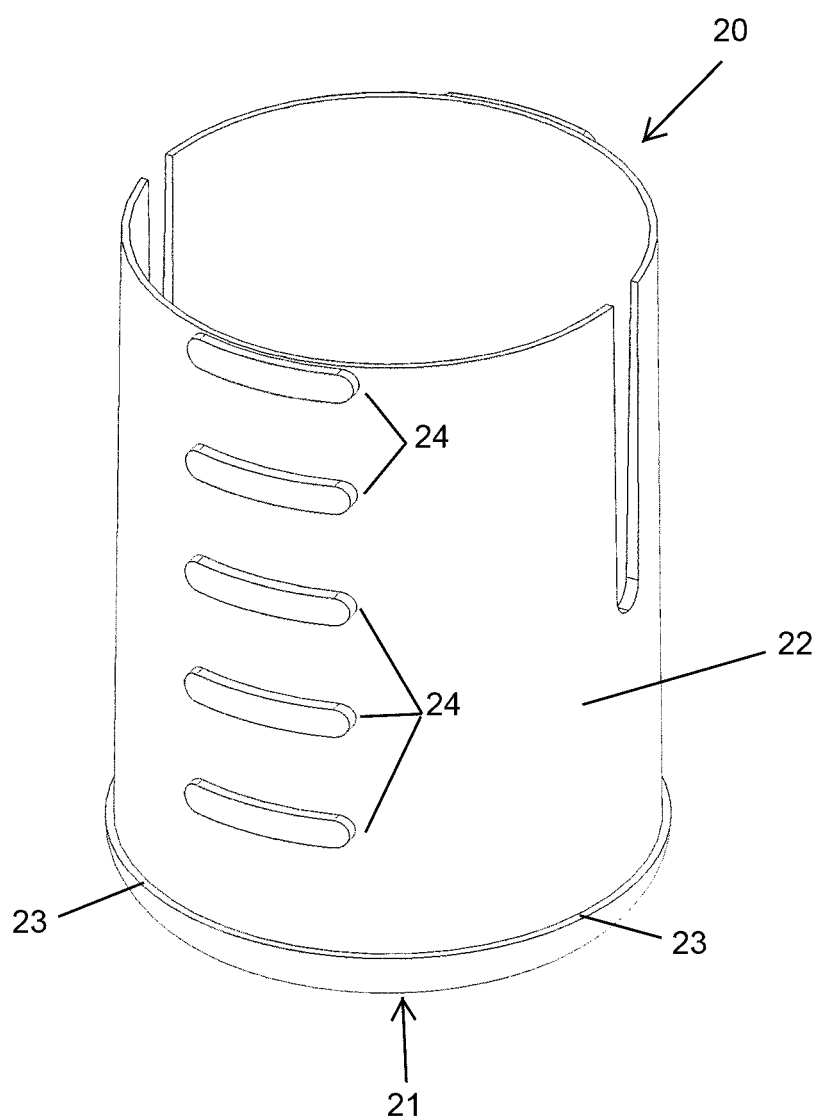
FIG. 4 is a perspective view of a thermal insulation insert that is located in the cavity of the integrally formed body shown in FIGS. 1 to 3.

FIG. 4 is an example of moulded thermal insulating material 20 that is fitted into the insulating region 15 of the container 10. As can be seen, the insulating material 20 has a base 21 and a side wall 22 extending upwardly from the base 21. A shoulder 23 of the base extends outwardly at the junction of the base 21 and the side wall 22. The side wall 22 also has projections 24 of the corresponding shape to fit into the apertures 18 in the outer wall 14 of the container 10.

Moreover, FIG. 4 illustrates thermal insulation 20 in a shape that represents the shape of the insulation 20 when it is moulded in the cavity 15.

Figure 5:
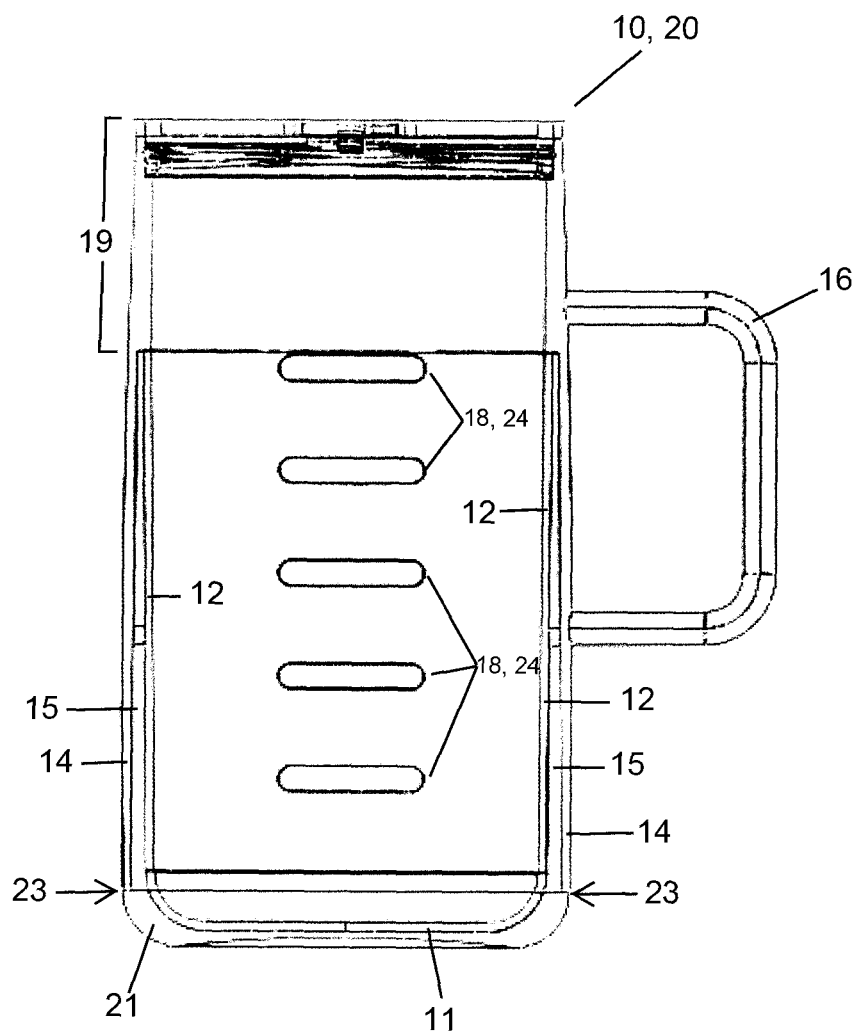
FIG. 5 is a front view of the integrally formed body of FIGS. 1 to 3 having the thermal insulating material fitted thereto.

FIG. 5 is a schematic illustration of a container 10 in which the insulation material 20 of FIG. 4 is located in the insulating region 15. As can be seen, the base 21 of the thermal insulating material 20 forms the bottom of the container 10 on which it can rest. Ideally, the thermal insulating material 20 has properties that make it a softer "gripping" material compared to the material from which the receptacle body, illustrated in FIGS. 1 to 3. For example, the thermal insulating material 20 may be rubberised.

The preferred embodiment the container 10 illustrated in FIGS. 6 to 11 has a receptacle body that is integrally formed and includes a base 11, an inner wall 12 extending upward from the base 11 and an outer wall 14 extending from the inner wall 12. As can best be seen in the cross-section views in FIGS. 7 and 8, the outer wall 14 is spaced from the inner wall 12 which forms an insulating region 15 in which an insulating material can be disposed. Specifically, the body has a first opening 17a in the form of an annular gap between the inner wall 12 and a lower end of the outer wall 14. The base 11 of the receptacle body protrudes below the outer wall 14. An additional second opening 17b in the form an annular gap is also provided between the inner wall 12 and the upper end of the outer wall 14.

Figure 7:
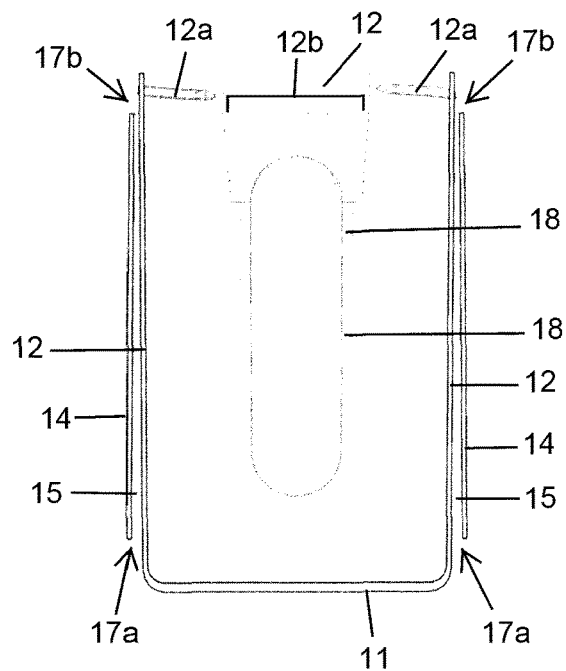
FIG. 7 is cross-sectional view along the line A-A in FIG. 6.
Figure 8:
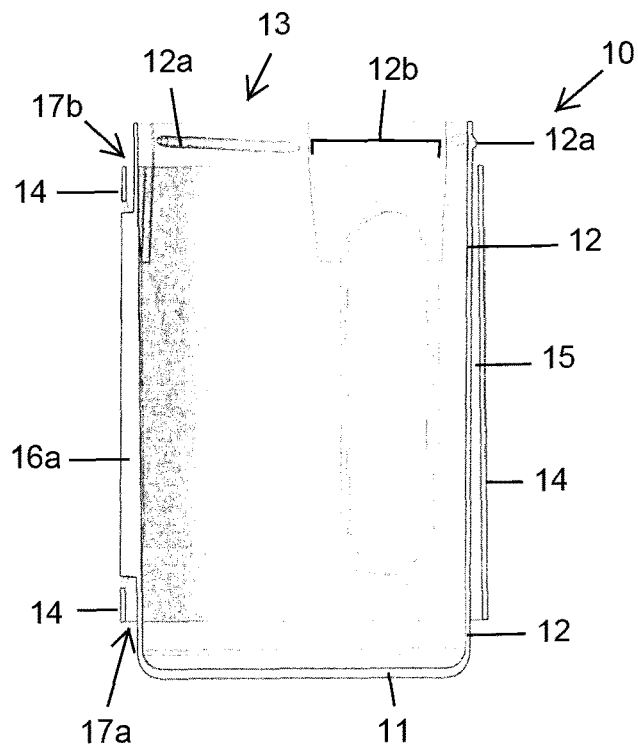
FIG. 8 is a cross-sectional view along the line B-B in FIG. 6.

The inner wall 12 has an essentially cylindrical configuration and the outer wall 14 also has an essentially cylindrical configuration. Accordingly, the insulating region 15 is also essentially an annular cylinder, save for connection elements 16a extending between the inner wall 12 and the outer wall 14. However, as can be seen in FIGS. 7 and 8, the inner and outer walls 12 and 14 preferably have a slight tapering structure in which the inside diameter of the receptacle defined by the inner wall 12 decreases moving down the container from the entrance 13 of the container 10 to the base 11. Ideally, the inner wall 12 has a constant thickness, although in other embodiments it will be appreciated that the inner wall 12 may be of increasing thickness from the entrance 13 of the container 10 toward the base 11. The outer wall 14 may also have a constant thickness and ideally increases in diameter moving down the container 10 toward the base 11. The width of the insulating region 15 between the inner and outer walls 12 and 14 may therefore also increases moving in a direction toward the base of the container 10.

As best seen in FIG. 8, the connecting elements 16a interconnecting the inner wall 12 and the outer wall 14 is located centrally over the length of the outer wall 14, and ideally, at a spacing from either one or a combination of the upper and lower edges of the outer wall 14. In the case of the preferred embodiment, three connecting elements 16a interconnect the inner and outer walls 12 and 14. The connecting elements 16a are integrally formed with the body and extend from the inner wall 12 and connect to the outer wall 14 by neck sections 16b (see FIG. 6).

Third openings or apertures 18 are provided in the outer wall 14 in the form of elongated apertures 18 that extend about the connecting elements 16a. The third openings 18 are separated by the neck sections 16b. It will be appreciated that the third openings 18 can be positioned at any location about the perimeter of the outer wall 14. For example, the third openings 18 can be arranged in a line in a longitudinal direction of the outer wall 14 as in the case of the embodiment shown in FIGS. 1 to 3.

Figure 6:
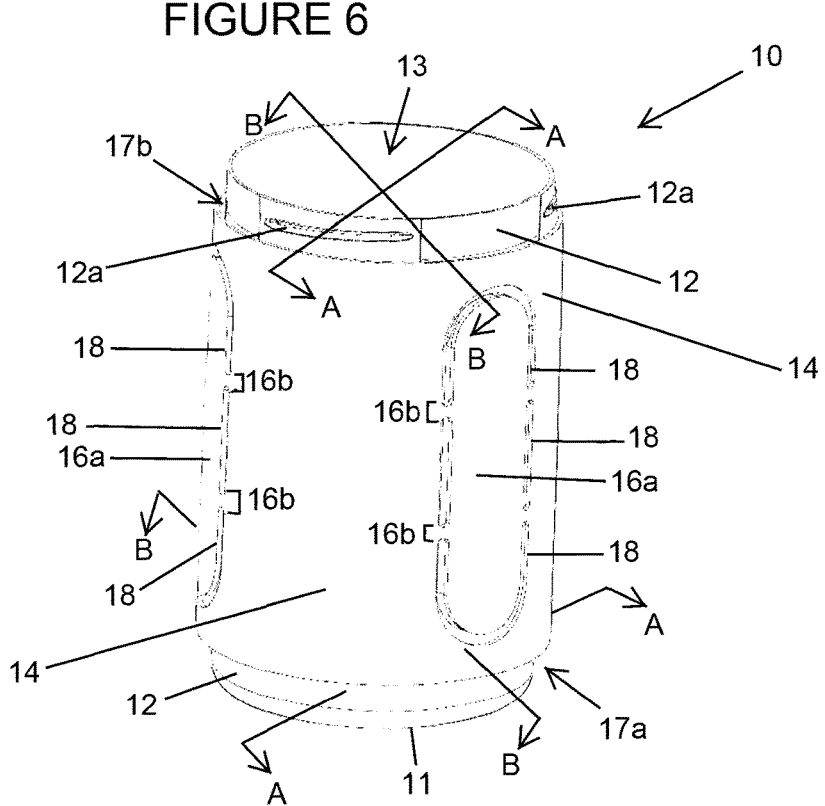
FIG. 6 is an isometric view of an integrally formed body of a container according to a preferred embodiment in which the walls are illustrated as non-transparent.

The upper end of the container 10 may have a fastening formation for attaching a lid to the container 10. In the case of the preferred embodiment, the inner wall 12 extends beyond the outer wall 14 and includes a suitable fastening formation for attached in a lid. The fastening formation may be any suitable forming including clips and or projections for retaining a lid on the container 10 by a frictional fit. As can be seen in FIGS. 6 to 8, the fastening formation of the preferred embodiment includes a threaded portion, comprising a screw thread 12a adjacent to the opening of the container for engaging a co-operating screw thread on a lid. The screw thread is a single thread having screw sections spaced about the perimeter by gaps 12b. Each screw section has the same configuration and orientation, and has a crest that protrudes beyond the cylindrical outer surface of the inner wall 12. The leading edge of the crest, when viewed in the clockwise direction about the container, extends downwardly from the opening of the container 10. Although not shown in the figures, the trailing end of the crest can also include a stop formation extending beyond the profile of the uniform crest to prevent the co-operating screw thread on a lid from being over-rotated in a closed position.

The container 10 shown in FIGS. 6 to 8 may include, and may ideally consist of, a heat softenable polymeric material such as a translucent or transparent polyester that is free of Biphenol A compounds. For example, a polymer sold under the trade name TRITAN is an example of commercial available heat softenable polymeric material.

Figure 11:
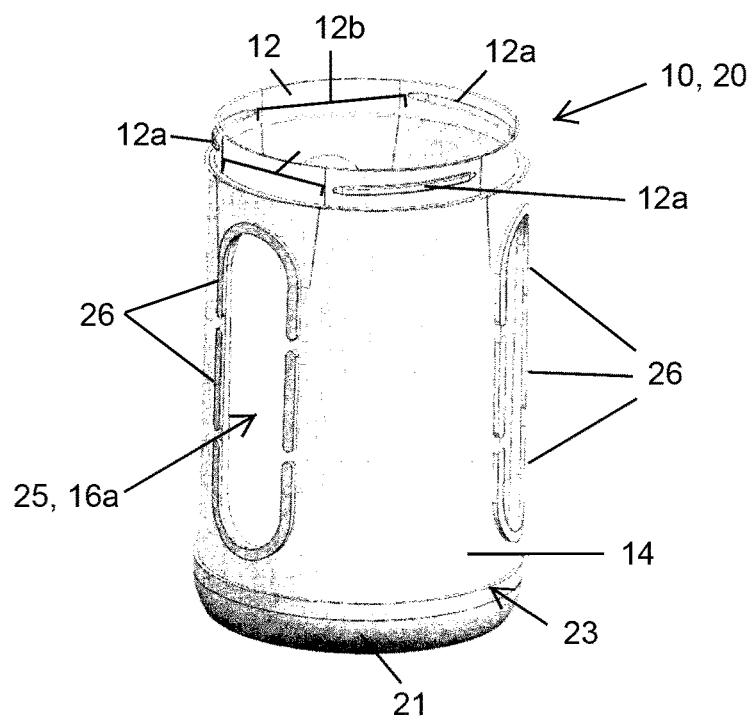
FIG. 11 is isometric view of the container of FIG. 6 which has been illustrated as transparent and in which the insulting material of FIG. 9 has been fitted thereto.

When the inner and outer walls 12 and 14 are made of the transparent or translucent material, the connecting elements 16a provide windows for viewing the content of the container 10. FIG. 6 illustrates the inner and outer walls 12 and 14 as non-transparent. However, as will be described in the more detail below, FIG. 11 illustrates the inner and outer walls 12 and 14 as if they were made of a transparent material.

As will be explained in more detail below, ideally the body is formed by injecting flowable material to the base region of the container 10, and the flowable material can then flow into the inner wall 12, and then from the inner wall 12 into outer wall 14 via the connecting elements 16a and the neck sections 16b connected to the outer wall 14.

Although it is possible that the insulating region 15 may be left vacant to allow air to act as an insulating material, suitably, the container also includes insulating body 20 made of an insulating that is disposed in the insulating region and in the third openings 18. The insulating body 20 may be made of any suitable material and preferably has a lower thermal conductivity than the thermal conductivity than the receptacle body of the container 10. The insulating material may also be more flexible than the receptable body 10.

Figure 9:
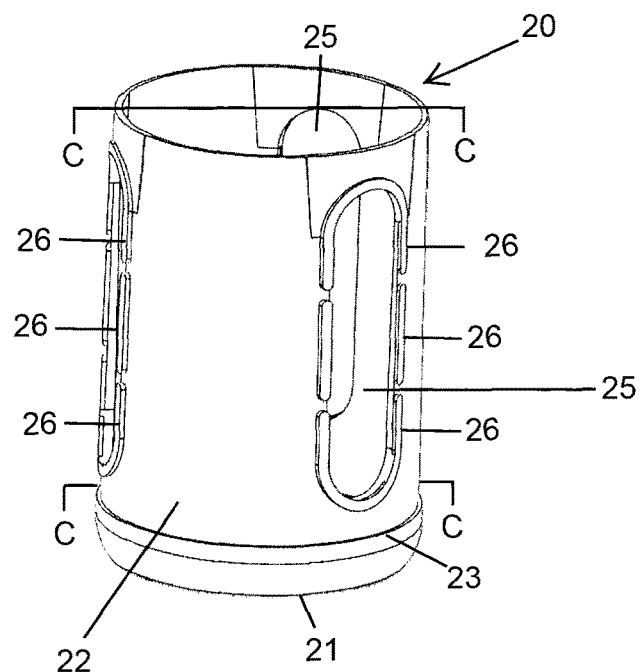
FIG. 9 is an isometric view of an insulating material that can be disposed in an insulating region of the integrally formed body illustrated in FIGS. 6 to 8.
Figure 10:
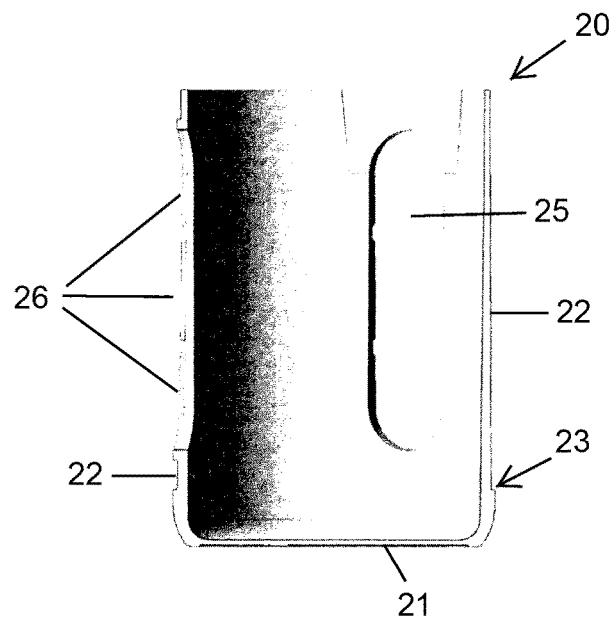
FIG. 10 is cross-sectional view along the line C-C in FIG. 9.

FIGS. 9 and 10 are perspective and cross-sectional views of the insulating body 20. As will be explained in more detail below, ideally the insulating material is made from a material that is flowable and can be injection moulded into the insulating region. Ideally, the insulating body 20 is an integrally formed body and has a bottom portion 21 and a side wall 22 extending upwardly from the bottom 21. A shoulder 23 of the bottom portion 21 protrudes outwardly at the junction of the side wall 22 and the bottom portion 21. The side wall 22 has three elongated cutouts 25 that accommodate the connecting elements 16a connecting the inner and outer walls 12 and 14 of the receptacle body 10. Located about the perimeter of the cutouts are protrusions 26 that extend through the third openings in the outer wall of the container and can be gripped in fingers of a user.

FIG. 11 illustrates the container 10 in which the receptacle body and the thermal insulating body 20 are fitted together. The receptacle body 10 is illustrated as if was made of transparent or translucent materials, and the insulating body 20 includes an opaque material. The bottom 21 of the thermal insulating body 20 covers and encloses the base 11 of the receptacle body 10 and the side wall 22 of the thermal insulating body extends between the inner and outer walls 12, 14 in the insulating region 15. The protrusions 20 on the side wall 22 of the thermal insulating body 20 extend through third openings 18 of the outer wall 14 and protrude beyond the outer face of the outer wall 14. An upper edge of the side wall 22 of the insulating body 20 is adjacent to an upper edge of the outer wall 14 of the receptacle body, however, it will be appreciated that the insulating body 20 may extend beyond an upper edge of the outer wall 14.

FIG. 12 is a schematic illustration of an openable lid 50. The container 10 may include the lid 50 although the lid 30 may also be supplied separately of the container 10. The lid 50 has a fastening formation for co-operating with the fastening formation of the receptacle body for attaching the lid 50 thereto.

The lid 50 has a skirt 51 defining an upper opening 52 through which the contents of the container can be consumed, and an openable closure having a pivotable top panel 53 that is mounted to a pair of lugs 54 extending inwardly. The top panel 53 is shown in FIGS. 13 and 14, however, the top panel 53 is not shown in FIG. 12. The skirt 51 includes a lower portion, the inner face of which has a co-operating fastening formation in the form of a single screw thread 55 having thread sections that are separated by gaps 56. The screw thread sections are in the form of a groove that receives the crests of the thread 12a of the receptacle body 10.

Although not shown in the figures, the grooves may also include an enlarged section at a leading end of the grooves and a constriction immediate prior to the enlarged section. The crests may also have a protrusion and when the protrusion is received by the enlarged section of the thread, the user will be able to identify when the lid has been completely secured in closed position.

FIGS. 13 and 14 illustrate the top panel 53 in a closed position in which the top panel 53 makes a seal. The seal can be formed using suitable arrangement, FIGS. 13 and 14 illustrate a rubber o-ring 36 about the perimeter of the top panel 53 which makes a seal with an inner surface of an upper portion of the skirt 51 of the lid 50. To open the top panel 33, one side of the top panel 33 can be pushed inwardly, about the pivot mounting 54, so that that the opposite side of the lid moves outwardly to locate the top panel 53 at an angle to its closed position.

The top panel 53 may also be removed from the lid for cleaning purposes. Although not shown in detail in the figures, the top panel 53 may have two pins extending from opposite sides that are received by the open lugs 54. The open lugs 54 may also have a downwardly facing slot extending in a longitudinal direction of the open lugs 54 and the pins may be configured so as to be able to pushed through the longitudinal slot when the top panel 53 is oriented in the opened position, thereby allowing the top panel to be removed. The pins of the top panel 53 are, however, retained in the lugs 54 when the top panel 53 is oriented into the closed position, or at any angle of orientation relative to an upright orientation.

The container 10 may also include one or more seal rings 56, such as an o-ring, for forming a seal between the lid and the receptacle body. For example, the lid 50 may include an inwardly extending ledge formation that engages the upper end of the inner wall of the receptacle body. The upper end of the inner wall of the ledge formation of the lid may have an o-ring from forming a seal. In another example, an upper end of the side wall of the insulating body may extend beyond the inner wall which can also form a seal against the lid when located in the closed position.

Figure 15A:
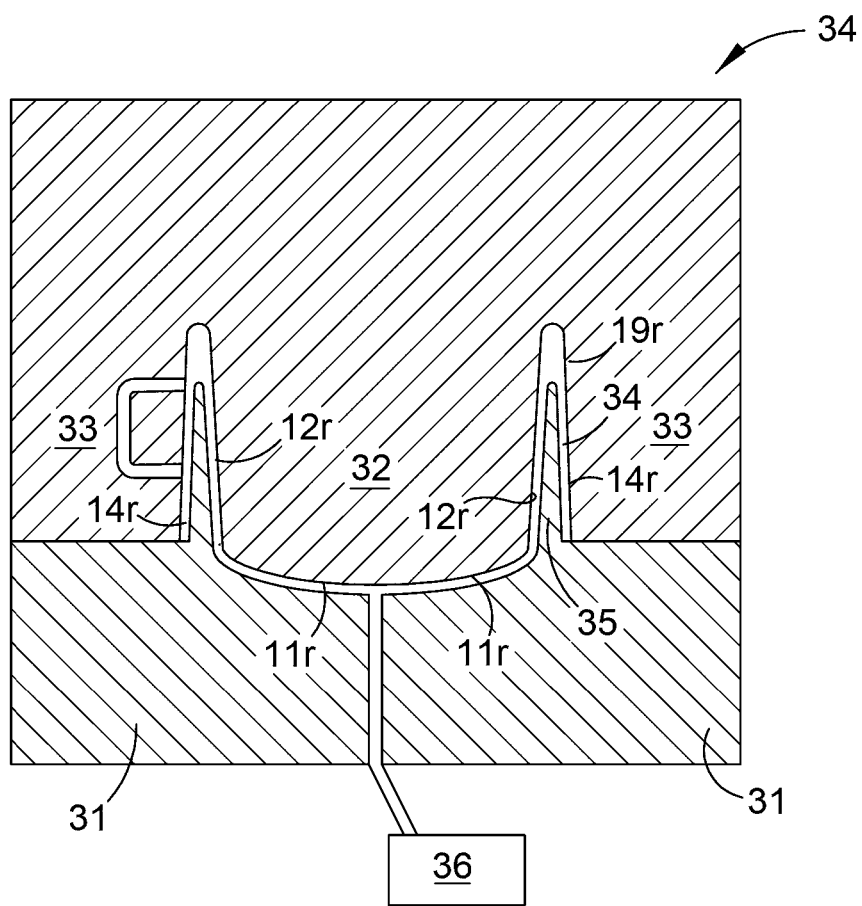
FIG. 15a is a schematic cross-sectional view of die casts in an inter-fitting mode for casting the receptacle body illustrated in FIGS. 1 to 3.

FIG. 15a is a schematic cross-sectional view of the die casts of a first moulding station for forming the receptacle body shown in FIGS. 1 to 3. In particular, the die cast includes a first mould 30 which receives a second mould 31. The first mould 30 has a central plug 32 and an outer peripheral portion 33 between which an annular trough 34 is formed. The annular trough 34 has an inward wall and an outward wall. The central plug 32 and outer peripheral portion 33 provided surfaces having a profile that forms the following:

i) an inside surface of the base wall 11 and inner wall 12 of the receptacle body; and ii) an outside surface of the outer wall 14.

The second mould 31 has an annular wall formation 35 that is received by the annular trough 34 formation of the first mould 30. The annular wall formation 35 has a tapered profile, reducing in cross-section in a direction toward the distal end thereof. When the annular wall 35 formation is located in an operative position, the annular wall 35 formation occupies and thereby defines the insulating region 15 formed between the inner and outer walls 12 and 14. The spacing between the end of the annular wall formation 35 and the annular trough formation 34 forms the annular wall section 19 at the entrance of the container 10, in accordance with the embodiment shown in FIGS. 1 to 3.

Figure 15B:
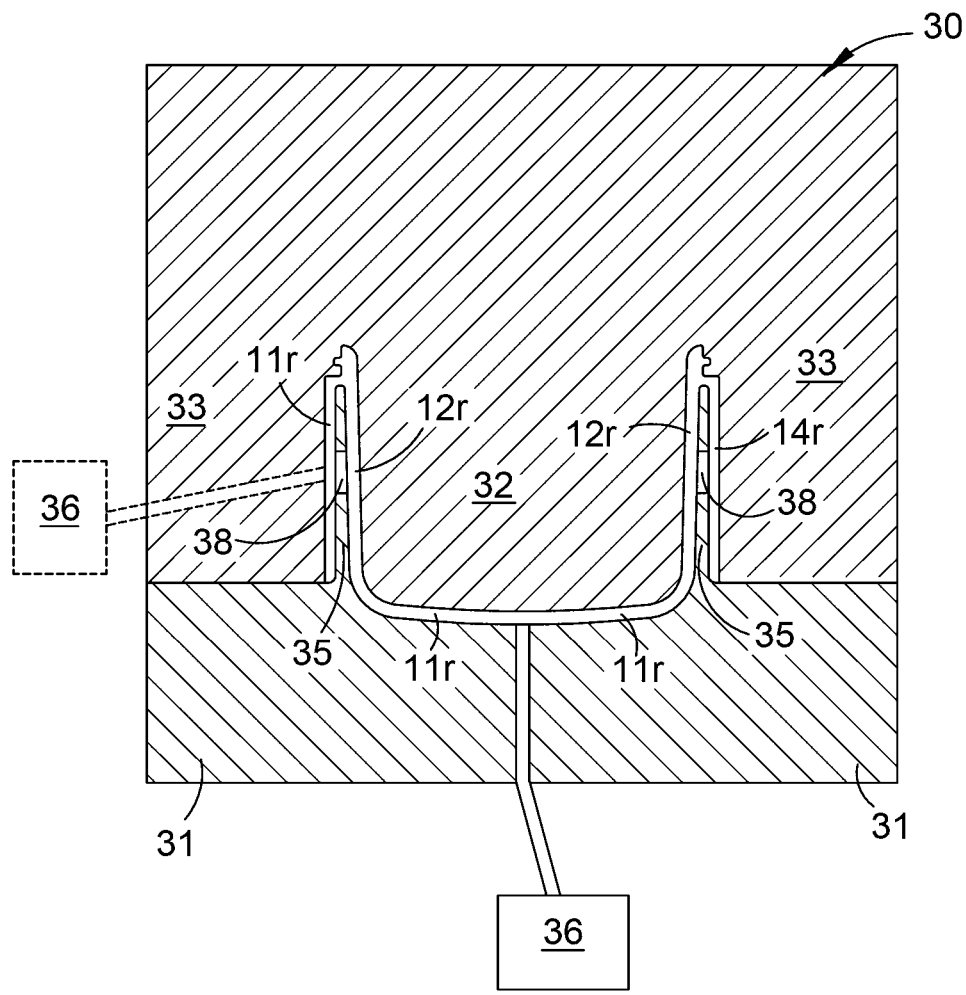
FIG. 15b is a schematic cross-sectional view of die casts in an inter-fitting mode for casting the receptacle body illustrated in FIGS. 6 to 8.
Figure 16:
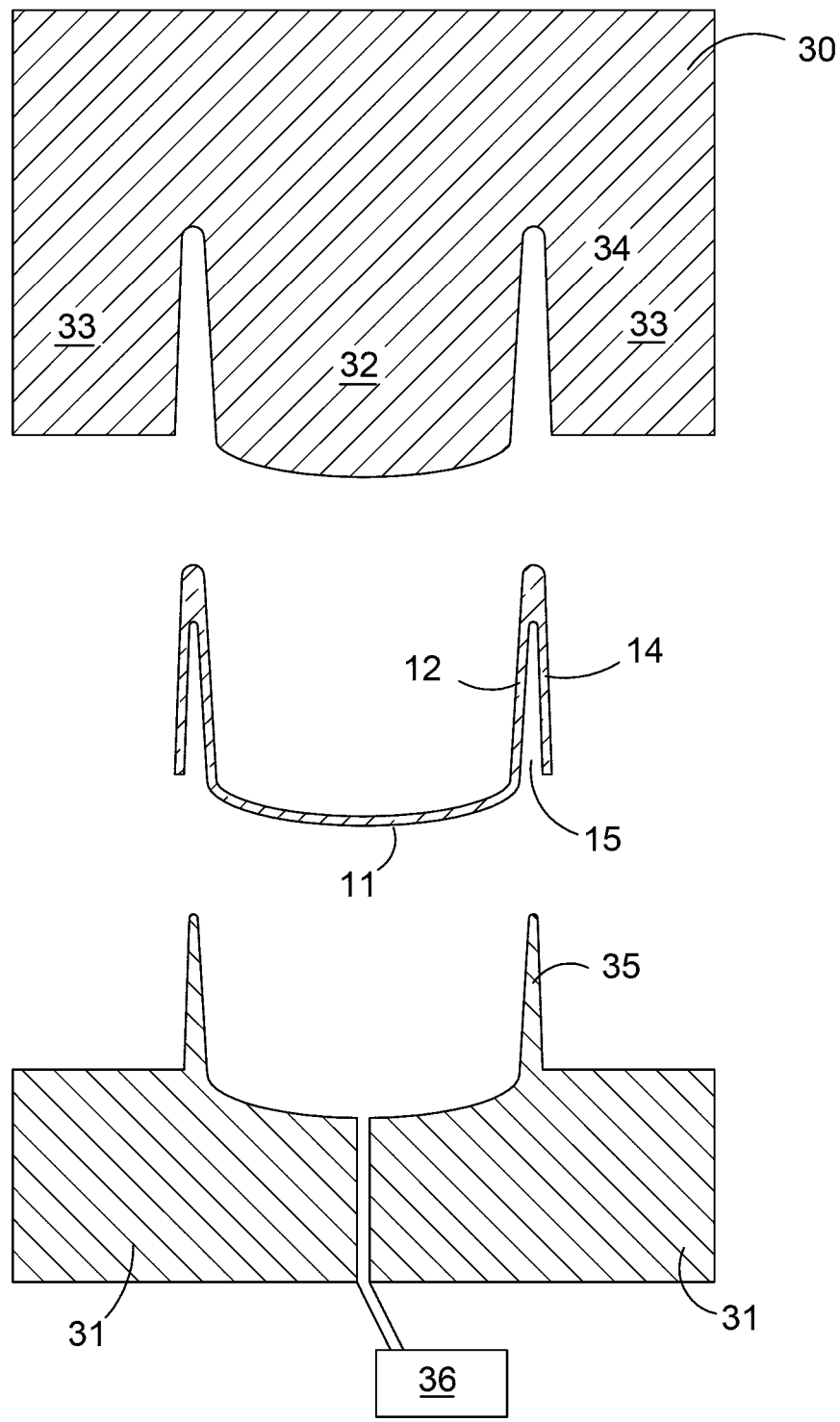
FIG. 16 is a schematic cross-sectional view of die casts in FIG. 5 in a separated mode and with the receptacle body released from the mould.

Although not shown in FIG. 15a, 15b or 16, the outer peripheral portion 33 of the first mould 30 includes bridging sections that engage the annular wall formation 35 to from the third opening in the outer wall 14. It will also be appreciated that the bridging sections may be provided on the annular wall formation 35 and engage the outer peripheral portion 33, when the first and second moulds 30, 31 are closed together. It is also possible that the portions of the bridging sections for forming the openings in the outer wall 14 may be provided on the outer peripheral portion 33 and the annular wall formation 35.

FIG. 15b is a schematic cross-sectional view of the die casts of a first moulding station for forming the receptacle body shown in FIGS. 6 to 8. The die cast includes a first mould 30 which receives a second mould 31. The first mould 30 has a central plug 32 and an outer peripheral portion 33 between which an annular trough 34 is formed. The annular trough 34 has an inward wall and an outward wall. The second mould 31 has an annular wall formation 35 that is received by the annular trough 34 formation of the first mould 30.

In order to mould the container shown in FIGS. 6 to 8, the annular trough formation 34 of the first mould 30 has an instep that engages an end of the annular wall formation 35 of the second mould 31 when in the closed position. The annular wall formation 35 thereby creates the first and second openings 17a and 17b at the lower and upper ends of the outer wall 14 of the receptacle body.

The annular wall formation 35 of FIG. 15b will also include one or more passageway 38, and suitably three passageways 38 extending through annular wall formation 35 that allows the flowable material to be conveyed from: i) the inner wall region in which the inner wall of the receptacle body is cast; to ii) the outer wall region in which the outer wall of the receptacle body is cast. The passageways 38 also defining the region in which the connection elements 16a between the inner wall 12 and the outer wall 14 are formed, which also provides window into the container 10 when the receptacle body is made of transparent or translucent material.

During the casting process, flowable material from a flowable material source 36 is injected in the mould at a centre of the base region 11r at a high pressure. The flowable material flows in a radial direction toward the inner wall region 12r and longitudinally along the inner wall region 12r. In the case of the embodiment shown in FIG. 15a, which is a schematic illustration for moulding the embodiment shown in FIGS. 1 to 3, the flowable material flows along the inner wall region 11r and into the annular wall region 19r, which forms the entrance of the container. The flowable material then continues to flow in an opposed direction along the outer wall region 14r in order to form a receptacle having a homogenous and integrally formed body.

In the case of the embodiment shown in FIG. 15b, which is a schematic illustration of the mould for casting the receptacle body shown in FIGS. 6 to 8, the flowable material flows from the base region 11r along inner wall region 12r, including into the annular wall 19r for casting the fastening formation, and from the inner wall formation into the outer wall region 14r via the passageways to form the windows and the connection necks.

It is also possible that flowable material may be supplied from a supplementary flowable material source, represented by the dashed lines in FIG. 15b.

Once the flowable material has cured, the second and first moulds 30, 31 are able to be separated as shown in FIG. 16, and the receptacle body removed. The receptacle body schematically illustrated in FIG. 16, represents the receptacle illustrated in FIGS. 1 to 3.

It will be appreciated that the first and second moulds may include several sub-die casts sections that can move independently to provide the required die formations for forming the inner wall, the outer wall and the connection elements including the window section, the necks connecting the window to the outer wall, and third openings in the outer wall for the insulating material.

Figure 17:
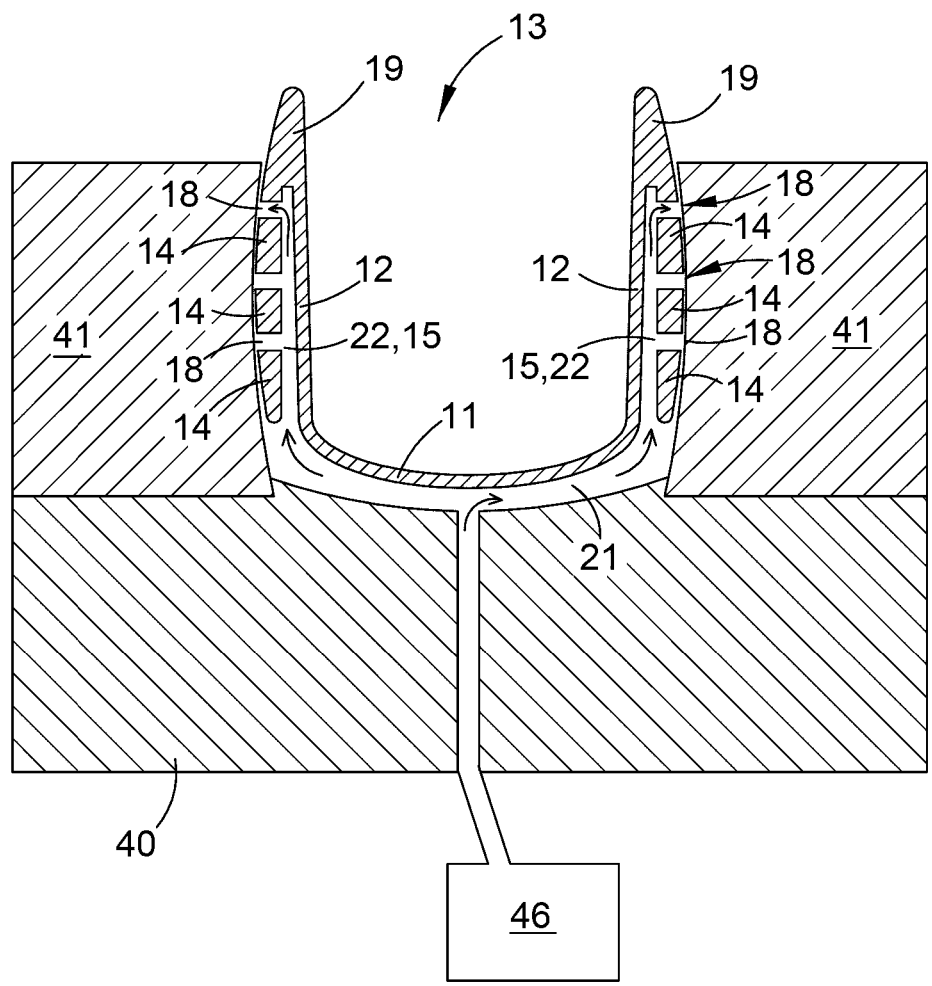
FIG. 17 is a schematic cross-sectional view of the receptacle body of the container and die casts in position for casting the thermal insulation illustrated in FIG. 4 into the container.

FIG. 17 is schematic cross-sectional view of the die casts of a second moulding station for casting the thermal insulating material 20 in the insulating region 15 of the receptacle body in situ. In the second moulding station, the receptacle body of either embodiment illustrated in FIGS. 1 to 3, or FIGS. 6 to 8, and in particular, the insulating region 15 of the receptacle body, forms part of the die cast. The second moulding station includes a bottom portion 40 having a bottom surface that forms the profile of the lowermost surface of the thermal insulating material 20. The second moulding station also includes an outer peripheral portion 41 that abuts against an outer face of the outer wall of the receptacle body.

During casting, the thermal insulating material 20 is injected in the base from the source 46 in a flowable form and flows outwardly between the bottom mould 40 and the base wall 11 of the receptacle body under pressure. The flowable material then flows into and along the insulating region 15 between the inner wall 12 and the outer wall 14 of the receptacle body, and finally through the third apertures 18 arranged in the outer wall 14. The thermal insulating material 20 in the apertures 18 may finish either beneath an outer face of the apertures 18, substantially flush with an outer rim of the apertures 18, or even protrude beyond the apertures 18 formed in the outer wall 14. In any event, the thermal insulating material 20 can provide finger gripping sections.

To allow the thermal insulating material 20 to flow over the base, within the cavity 14 and into the apertures 18, ideally, at least one of the apertures 18 is provided proximate a distal end of the cavity 15 to allow air to be vented from the casting.

In the insulating material may be made from any suitable material and ideally has a lower thermal conductivity then the receptacle body. The insulating material may also be softer, or more resiliently deformable than the material of the insulating material.

Figure 18:
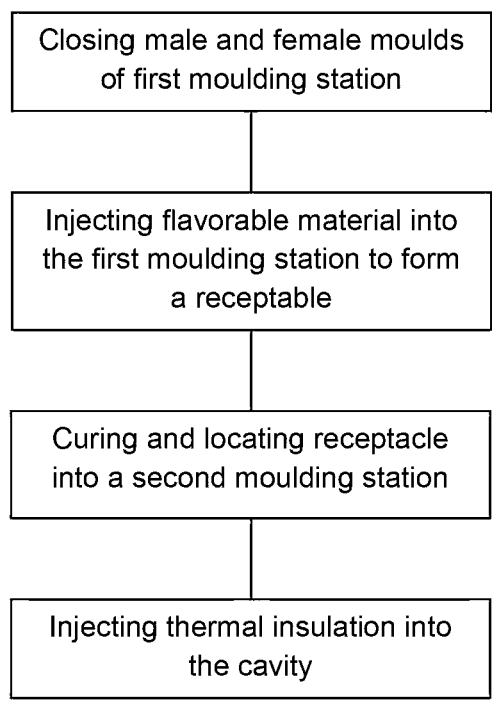
FIG. 18 is a block diagram of the process step for forming the container according to an embodiment.

FIG. 18 depicts the process steps for making the food container which can be described as follows.
 i) Moving the first and second moulds 30 and 31 of the first moulding station to form a closed mould in which an annular wall formation 35 of the second mould 31 is received by the annular trough formation 34 of the first mould 30.
 ii) Injecting flowable material from a flowable material source 36 into the base of the casting void.
 iii) Conveying the flowable material under pressure radially over the base region 11r, longitudinally along the inner wall region 12r, into the annular upper wall 19r to form the entrance of the container, and into the outer wall region 14r of the container. Conveying the flowable material into the handle formation of the mould if a handle is being provided.
iv) Allowing the flowable material to cure.
v) Opening the die cast of the first moulding station and removing the receptacle of the container.
vi) Locating the receptacle in a second mould station having an outer peripheral portion 41 that engages the outer wall 14 and bottom moulding profile 40 relative to the base of the receptacle.
vii) Injecting the thermal insulation material 20 into the cavity 15 in the form of a flowable material, venting the air from the cavity for example via the apertures 18 in the outer wall 14 of the receptacle.
viii) Conveying the thermal flowable material to form the base 11, and long the cavity 15, and into the openings 18.

It will be understood to persons skilled in the art of the invention that many modifications may be made without departing from the spirit and scope of the invention. For example, it is possible that the thermal insulating material may be cast in a dedicated mould and cured to form a free standing item that is then, for instance, manually inserted into the cavity of the receptacle.

The invention claimed is:

1. A cup for a hot or cold drink, the cup including:
a base and an inner wall extending from the base to form an entrance for placing food in the cup;
an outer wall extending about the inner wall at a spacing from the inner wall so as to define an insulating region between the outer wall and the inner wall,
wherein the base, the inner wall, and the outer wall of the cup are integrally formed and forms a receptacle body; and
an insulating body comprising a bottom wall and a side wall extending from the bottom wall, wherein the bottom wall and the side wall comprise an insulating material that is a solid polymeric material, wherein the side wall is located inside of the insulating region, wherein the bottom wall covers and encloses the base and is exposed so that the cup is seated on the bottom wall of the insulating body, and wherein the solid polymeric material of the insulating body is a softer gripping material compared to the receptacle body.

2. The cup according to claim 1, wherein the solid polymeric material of the insulating material is moulded in-situ in the insulating region and is supplied initially as a flowable material into an opening of the insulating region and cures thereafter.

3. The cup according to claim 2, wherein the insulating material disposed in the insulating region has a lower thermal energy conductivity than a thermal conductivity of the base, the inner wall and the outer wall.

4. The cup according to claim 1, wherein the receptacle body is made of transparent or translucent materials.

5. The cup according to claim 1, wherein the inner wall extends beyond an upper part of the outer wall and the inner wall extends to the base of the cup, and the base of the cup protrudes beyond the outer wall.

6. The cup according to claim 1, wherein the inner wall extends along a length and beyond opposite ends of the outer wall.

7. The cup according to claim 1, wherein the insulating region has an annular cylinder formation between the inner wall and the outer wall and a width of the insulating region between the inner and outer walls increases moving in a direction toward the base of the cup.

8. The cup according to claim 1, further comprising a first annular aperture extending about a lower edge of the outer wall.

9. The cup according to claim 1, further comprising a second annular aperture extending about an upper edge of the outer wall.

10. The cup according to claim 1, further comprising a third aperture in the outer wall that is spaced from upper and lower edges of the outer wall and is sized so that the insulating material can extend through the third aperture and provide a gripping surface for a user.

11. The cup according to claim 1, wherein the insulating region includes an annular formation between the inner and outer walls and includes one or more connection elements interconnect the inner and outer walls.

12. The cup according to claim 11, wherein the connecting elements are spaced from a lower end of the outer wall.

13. The cup according to claim 11, wherein the connecting elements are spaced from an upper end of the outer wall.

14. The cup according to claim 1, wherein the cup includes a screw thread adjacent to the entrance of the cup for attaching a lid to the cup, wherein the screw thread is arranged on an outer face of an upper part of the inner wall that extends beyond the outer wall, and wherein the screw thread adjacent to an opening of the insulating region includes at least two thread sections that extend about the cup, in which there are gaps, in a direction about a perimeter of the cup between the thread sections which allow co-operating thread sections of the lid to be aligned with the gaps and passed there through.

15. The cup according to claim 14, wherein the lid comprises co-operating thread sections on an inside face of the lid that receive the male thread ribs to screw thread the lid onto the cup, and wherein the lid has a skirt defining an upper opening through which the contents of the cup can be consumed from the cup, and an openable closure having a pivotable top panel that can be pivoted between a closed position in which the top panel forms a seal with the upper opening, and an opened position in which the top panel is oriented at an angle to the closed position to allow a user to drink from the cup.

16. A cup for a hot or cold drink, the cup including:
a base and an inner wall extending from the base to form an entrance for placing food in the cup;
an outer wall extending about the inner wall at a spacing from the inner wall so as to define an insulating region between the outer wall and the inner wall, wherein the base, the inner wall, and the outer wall of the cup are integrally formed and form a receptacle body; and
an insulating body that has a bottom wall and a side wall extending from the bottom wall, wherein the bottom wall and the side wall comprise an insulating material that is a solid polymeric material, wherein the side wall is located inside of the insulating region, wherein the bottom wall covers and encloses the base and is exposed so that the cup is seated on the bottom wall of the insulating body, and wherein the solid polymeric material of the insulating body is a softer gripping material compared to the receptacle body,
wherein the receptacle body includes an aperture in the outer wall that is spaced from upper and lower edges of the outer wall and is sized so that the insulating material can extend through an aperture and provide a gripping surface for a user wherein the cup includes a screw thread adjacent to the entrance of the cup for attaching a lid to the cup, wherein the screw thread is arranged on an outer face of an upper part of the inner wall that extends beyond the outer wall, and wherein the screw thread adjacent to an opening of the insulating region includes at least two thread sections that extend about the cup, in which there are gaps, in a direction about a perimeter of the cup between the thread sections such that co-operating thread sections of the lid can be aligned with the gaps and passed therethrough wherein the lid has an openable closure having a pivotable top panel that can be pivoted between a closed position in which the top panel forms a seal with the upper opening, and an opened position in which the top panel is oriented at an angle to the closed position to allow the user to drink from the cup.

\* \* \* \* \*